United States Patent
Tanaka

(10) Patent No.: US 6,909,362 B2
(45) Date of Patent: Jun. 21, 2005

(54) VEHICLE THEFT PREVENTION DEVICE

(75) Inventor: Shinichi Tanaka, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 21 days.

(21) Appl. No.: 10/232,868

(22) Filed: Aug. 30, 2002

(65) Prior Publication Data

US 2003/0043017 A1 Mar. 6, 2003

(30) Foreign Application Priority Data

Aug. 30, 2001 (JP) ........................................ 2001-261690

(51) Int. Cl.[7] .............................................. B60R 25/10
(52) U.S. Cl. ........................... 340/426.28; 340/426.17; 340/426.3; 307/10.4
(58) Field of Search .......... 340/426.28, 426.13–426.18, 340/426.22, 426.25, 426.3, 426.35, 426.36; 307/10.3–10.6

(56) References Cited

U.S. PATENT DOCUMENTS 5,307,048 A * 4/1994 Sonders ................. 340/426.12
5,990,785 A * 11/1999 Suda ..................... 340/426.21

FOREIGN PATENT DOCUMENTS

| CN | 93117685.9 | 3/1995 |
| EP | 1 046 558 | 10/2000 |
| JP | U-6-47059 | 6/1994 |
| JP | JU-Y2-2573058 | 3/1998 |
| JP | A-2001-90405 | 4/1998 |
| JP | A-11-303480 | 11/1999 |
| JP | A-2000-118357 | 4/2000 |
| JP | A-2001-18754 | 1/2001 |

OTHER PUBLICATIONS

Office Action, dated Dec. 3, 2004, from corresponding Chinese patent application no. 021295026.

* cited by examiner

Primary Examiner—Jeffery Hofsass
Assistant Examiner—Jennifer Stone
(74) Attorney, Agent, or Firm—Christie, Parker and Hale, LLP

(57) ABSTRACT

The occurrence of vehicle theft is more positively prevented when a door and running system of a vehicle are unlocked, by a remote controller, with different identification codes. The door of a vehicle is locked when an identification code is inputted from the remote controller, and the door cannot be unlocked as long as the same identification code is not inputted from the remote controller. The running system of the vehicle is locked when the driver of the vehicle pushes the switch of an interior device in driver-selected order. As long as the switch of the interior device is pushed in the same order, the running system can be unlocked. As a result, theft of the vehicle can be more positively prevented.

27 Claims, 11 Drawing Sheets

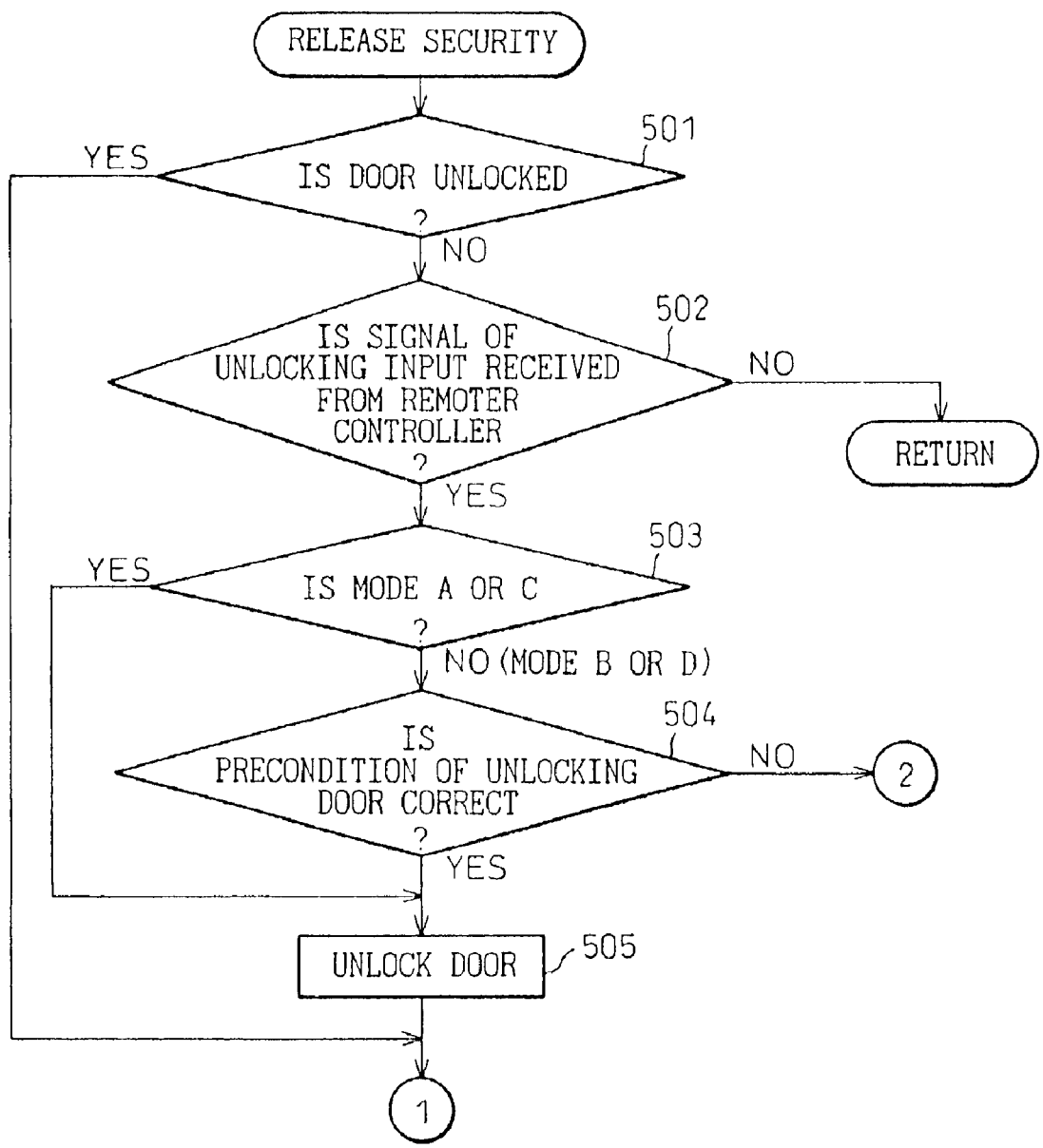

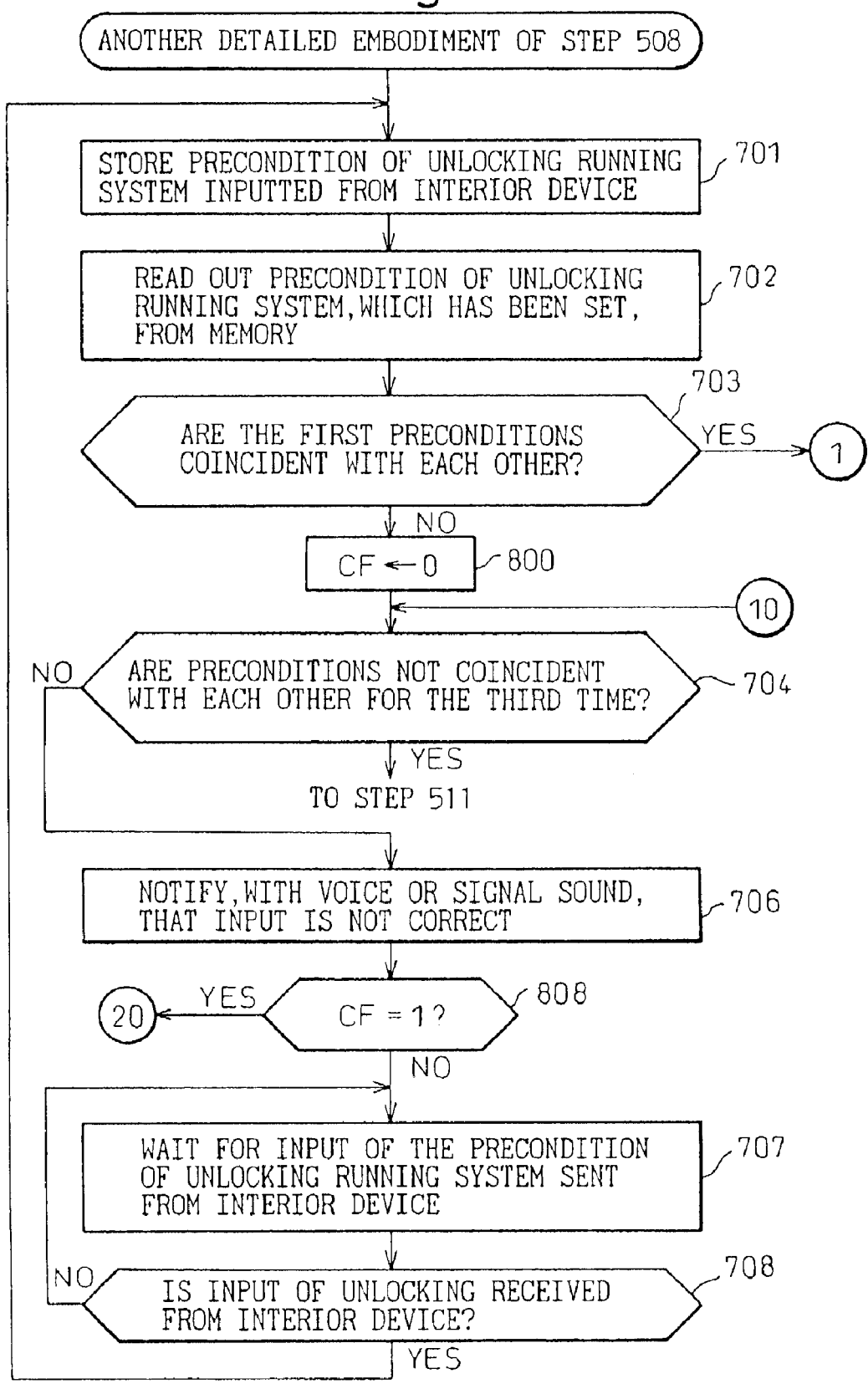

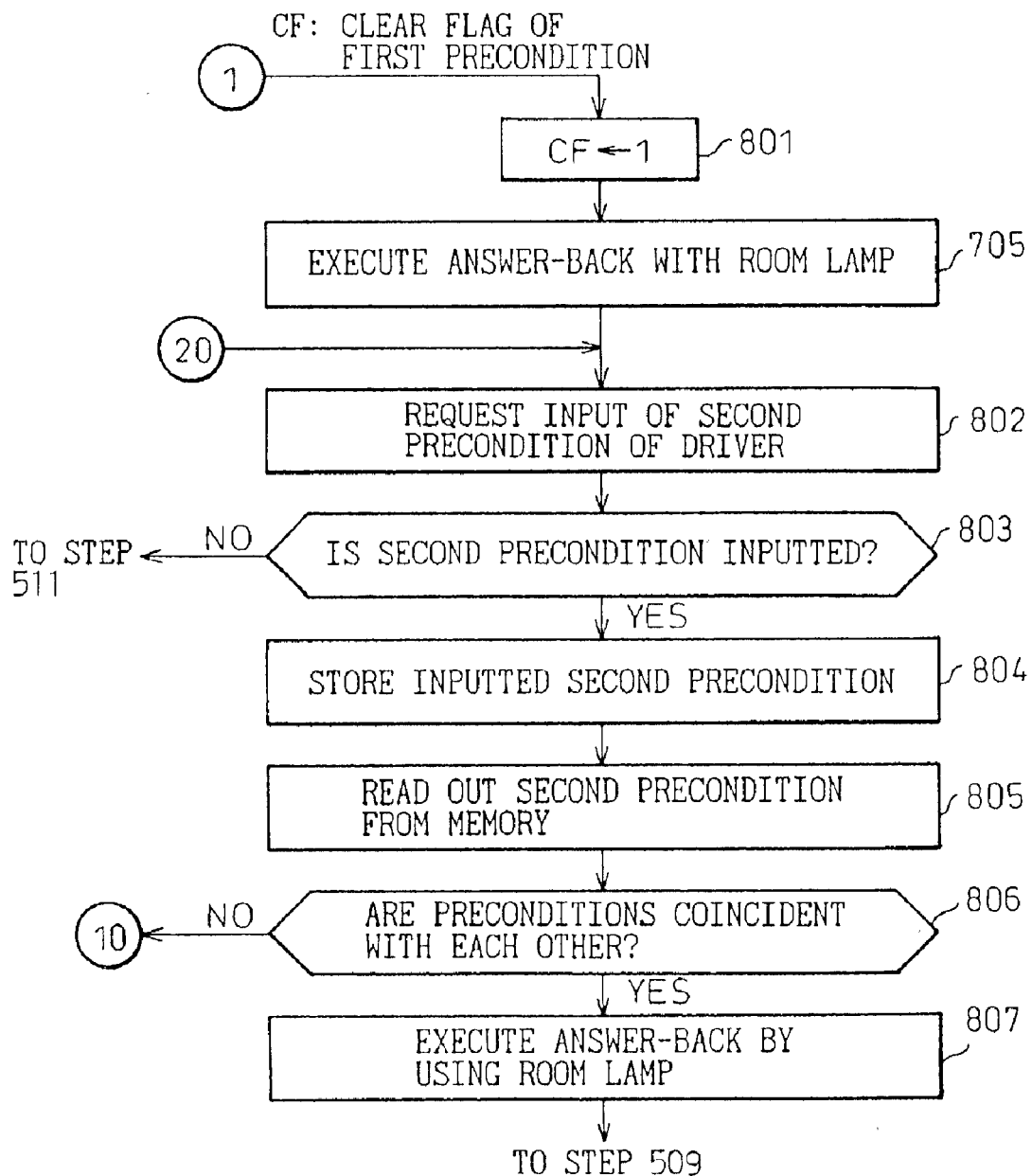

VEHICLE THEFT PREVENTION DEVICE

CROSS-REFERENCE TO RELATED APPLICATION

This application claims the priority of Japanese Patent Application No. 2001-261690, filed on Aug. 30, 2001.

BACKGROUND OF THE INVENTION

1. Field of the Invention

The present invention relates to a vehicle theft prevention device. More particularly, the present invention relates to a vehicle theft prevention device by which a vehicle can be surely prevented from being stolen when unlocking of a vehicle door and unlocking of a vehicle drive system are separately conducted.

2. Description of the Related Art

Conventionally, it is common to use a key when a vehicle door is locked and unlocked. However, when the above door locking and unlocking method using a key is adopted, there is a high possibility that the vehicle is stolen because a door can be unlocked, with criminal intent, using a copied key or special tool such as a picking tool.

In order to solve the above problem, a keyless entry device, the theft prevention property of which is high, has been recently put into practical use. This keyless entry device is composed as follows. An identification code is stored in a control unit mounted on a vehicle. When the identification code and a command for locking or unlocking a door of the vehicle are transmitted from the outside of the vehicle to the control unit by a remote controller, the door can be locked or unlocked. In this way, a key hole in the door is not needed. Therefore, the occurrence of vehicle theft can be surely prevented.

In the above keyless entry device, when an unlocking operation of the door is conducted with the remote controller for opening and closing the door, a door unlocking signal is sent from the remote controller and received by the control unit mounted on the vehicle. The control unit collates an identification code, which is contained in the thus received door unlocking signal, with an identification code stored in a memory of the control unit itself. When the identification code, which is contained in the thus received door unlocking signal, is coincident with the identification code stored in the memory of the control unit, the door can be unlocked.

However, even in the case of a vehicle equipped with the above keyless entry device, it is impossible to prevent the vehicle from being stolen in the following cases. In the case where a key is stolen, or in the case where an identification code of the key is decoded by a decoder so that a copied key is made, or in the case where a door is forced to open, it is impossible to avoid of theft of the vehicle.

As a means for solving the above problems, there is provided a vehicle theft prevention device in which locking and unlocking mechanisms are provided in both the vehicle running system and the vehicle door opening and closing system, and only when a driver unlocks the door with a remote controller, can unlocking of the door and unlocking of the vehicle running system be simultaneously conducted. When the vehicle theft prevention device of the above proposition is adopted in a vehicle, in the case where a person breaks into the vehicle by illegally forcing the door open, as the running system of the vehicle is still locked, it is impossible for the person to drive the vehicle. Therefore, theft of the vehicle can be prevented.

However, in the above vehicle theft prevention device in which locking and unlocking mechanisms are provided in both the vehicle running system and the vehicle door opening and closing system, the following problems may be encountered. As the door of the vehicle is unlocked and the running system of the vehicle is unlocked at the same time by operating the remote controller, in the case where a driver leaves the vehicle after the driver has unlocked both the door and the vehicle running system with the remote controller, the vehicle may be stolen by an intruder into the vehicle.

SUMMARY OF THE INVENTION

It is an object of the present invention to provide a vehicle theft prevention device, in which locking and unlocking mechanisms are provided in both the vehicle running system and the vehicle door opening and closing system, which is capable of more positively preventing the vehicle from being stolen because the vehicle running system cannot be unlocked even after the vehicle door has been unlocked by the remote controller.

In order to accomplish the above object, it is considered to provide the first to the sixteenth aspects, of the present invention, as follows.

In the first aspect, a vehicle theft prevention device comprises: a first security means for locking a vehicle so as to prevent an intrusion into the vehicle; a second security means for locking a running system of the vehicle; and an unlocking means for independently unlocking the first and the second security means.

In the second aspect, there is provided a vehicle theft prevention device according to the first aspect in which, at least one of the first and the second security means conducts locking, when a driver locks a door of the vehicle from the outside of the vehicle after the driver inputs the specific precondition into the unlocking means before the driver leaves the vehicle.

In the third aspect, there is provided a vehicle theft prevention device, according to the second aspect, wherein the unlocking means is capable of independently unlocking the first and the second security means after the input of the precondition by the driver.

In the fourth aspect, there is provided a vehicle theft prevention device according to one of the first to the third aspect, wherein the unlocking means is composed of a first and a second unlocking means, the first unlocking means unlocks the first security means, and the second unlocking means unlocks the second security means.

In the fifth aspect, there is provided a vehicle theft prevention device according to the fourth aspect, wherein the second unlocking means can be operated after the first unlocking means has conducted an unlocking operation.

In the sixth aspect, there is provided a vehicle theft prevention device according to the fifth aspect wherein, when the second unlocking means does not conduct an unlocking operation in a predetermined period of time after the completion of unlocking operation conducted by the first unlocking means, the first security means conducts a locking operation again.

In the seventh aspect, there is provided a vehicle theft prevention device according to the second or the sixth aspect, wherein the setting of the locking operation of the first security means and the unlocking operation of the first unlocking means is conducted by a remote controller capable of transmitting a vehicle door locking signal and vehicle door unlocking signal.

In the eighth aspect, there is provided a vehicle theft prevention device according to the seventh aspect, wherein the setting of the locking operation of the first security means and the unlocking operation of the first unlocking means is conducted by the remote controller according to the numbers of pushed times of pushing push-buttons of the remote controller.

In the ninth aspect, there is provided a vehicle theft prevention device according to the eighth aspect, wherein the setting of the locking operation of the second security means and the unlocking operation of the second unlocking means is conducted by utilizing buttons of an interior device arranged close to a driver's seat in the vehicle.

In the tenth aspect, there is provided a vehicle theft prevention device according to the ninth aspect, wherein the setting of the locking operation of the second security means and the unlocking operation of the second unlocking means is conducted by the buttons of the interior device according to a combination of the number of times buttons are pushed or positions of the buttons are pushed.

In the eleventh aspect, there is provided a vehicle theft prevention device according to the ninth or the tenth aspect wherein, when the setting of the locking operation of the second security means and the unlocking operation of the second unlocking means conducted by buttons of the interior device is completed, the completion of the setting is notified to a driver by another interior device different from the first interior device.

In the twelfth aspect, there is provided a vehicle theft prevention device according to the tenth aspect, wherein the following mode is set such that when the setting of the locking operation of the second security means recited in the tenth aspect is performed in a plurality of stages, an unlocking operation by the second unlocking means is possible only when the unlocking operation is performed in a plurality of stages in the same manner as that of the locking operation.

In the thirteenth aspect, there is provided a vehicle theft prevention device according to the ninth or tenth aspect, wherein the unlocking operation of the second unlocking means and that of the first unlocking means are simultaneously performed according to a combination of the numbers of times buttons of the interior device are pushed or positions of the buttons are pushed.

In the fourteenth aspect, there is provided a vehicle theft prevention device according to the ninth or the tenth aspect, wherein the confirming operation of confirming the setting, which is performed by another interior device, is different between when the setting of the precondition of the unlocking operation conducted by the second unlocking means with the button of the interior device is performed simultaneously with the unlocking operation of the first unlocking means and when the setting of the precondition of the unlocking operation conducted by the second unlocking means is performed independently from the unlocking operation of the first unlocking means.

In the fifteenth aspect, there is provided a vehicle theft prevention device according to the fourteenth aspect, wherein a difference of the confirming operation conducted by the interior device is a difference of the number of times of turning on and off a lamp in a vehicle compartment.

In the sixteenth aspect, there is provided a vehicle theft prevention device according to the first aspect, wherein when the first and the second security means are locked by locking the door with the key or with the remote controller capable of transmitting a vehicle door locking signal and unlocking signal after the driver gets out of the vehicle, the first and the second security means can be simultaneously unlocked by an unlocking operation conducted by the key or the remote controller.

According to the vehicle theft prevention device of the present invention, unlocking the first security means for locking the intrusion into a vehicle and unlocking the second security means for locking the running system of the vehicle can be independently performed by the unlocking means. Therefore, it possible to positively prevent the vehicle from being stolen.

In this case, the first and the second security means can be unlocked only when a specific precondition inputted into the unlocking means before the driver gets out of the vehicle is inputted into the unlocking means. Therefore, it is possible to provide a high security against vehicle theft.

The first security means is unlocked by the first unlocking means, and the second security means is unlocked by the second unlocking means. Further, the second unlocking means can not be operated unless the first unlocking means is operated. Therefore, it is possible to provide a high security against vehicle theft.

A locking operation of the first security means and an unlocking operation of the first unlocking means are performed according to the number of pushed buttons of the remote controller, and the setting of the locking operation of the second security means and the setting of unlocking operation of the second unlocking means are performed according to a combination of the pushed buttons of the interior device arranged close to a driver's seat of the vehicle. Due to the foregoing, vehicle theft can be positively prevented by parts which already exist. Therefore, the cost to prevent the occurrence of vehicle theft can be reduced.

Further, a locking operation of the second security means and a locking operation of the first security means and an unlocking operation of the second unlocking means and an unlocking operation of the first unlocking means can be performed simultaneously by a combination of the number of pushed buttons of the interior device. Due to the foregoing, in the case where there is no possibility of vehicle theft, an unlocking operation can be simplified and the unlocking operation time can be reduced.

The number of times of turning on and off the room lamp in the vehicle compartment is different between when the setting of locking operation of the second security means and the setting of unlocking operation of the second unlocking means are conducted simultaneously with a locking operation of the first security means and an unlocking operation of the first unlocking means and when the setting of a locking operation of the second security means and the setting of an unlocking operation of the second unlocking means are conducted separately from a locking operation of the first security means and an unlocking operation of the first unlocking means. In this way, when confirming the operation of confirming the setting by the interior device is made different as described above, the driver can conveniently confirm the setting mode.

In the case where door locking is conducted with the key or only door locking is conducted with the remote controller after the driver has got out of the vehicle, the first and the second security means are simultaneously unlocked by unlocking operation of the door conducted by the remote controller. Due to the foregoing, the driver can conveniently operate the vehicle.

BRIEF DESCRIPTION OF THE DRAWINGS

The present invention will become more apparent from the following descriptions of embodiments with reference to the accompanying drawings.

FIGS. 5A and 5B are flow charts showing an example of the procedure for releasing security from a vehicle theft prevention device of the present invention.

FIG. 6 is a partial flow chart of the flow chart shown in FIGS. 5A and 5B, wherein FIG. 6 shows an example of step 504 in detail.

FIG. 7 is a partial flow chart of the flow chart shown in FIGS. 5A and 5B, wherein FIG. 7 shows an example of step 508 in detail.

FIGS. 8A and 8B are partial flow charts of the flow chart shown in FIGS. 5A and 5B, wherein FIGS. 8A and 8B shows another example of step 508 in detail.

DESCRIPTION OF THE PREFERRED EMBODIMENTS

Referring to the accompanying drawings, embodiments of the present invention will be explained in detail as follows.

Figure 1:
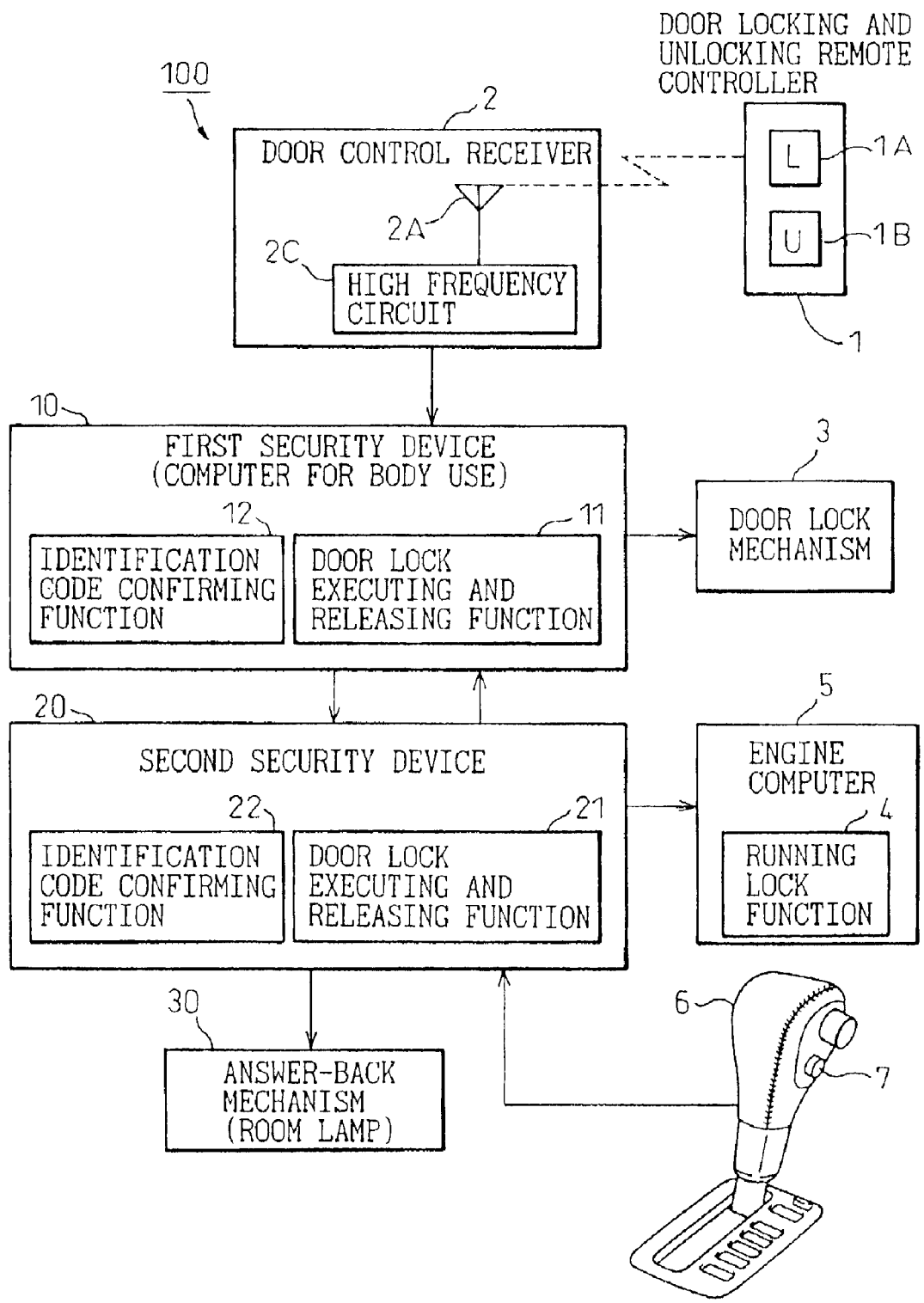
FIG. 1 is an arrangement view showing an overall arrangement of an embodiment of the theft prevention device of the present invention.

FIG. 1 is a block diagram showing an arrangement of an embodiment of the vehicle theft prevention device 100 of the present invention. The vehicle theft prevention device 100 of this embodiment includes: a remote controller 1, which is capable of being taken out from a vehicle, used for locking and unlocking a door; a door control receiver 2 arranged inside the vehicle; a door lock mechanism 3; an engine computer 5 having a function of locking the vehicle from running; a transmission control switch (overdrive ON-OFF switch) 7, used for inputting an identification code, arranged in the gear shift knob 6; a first security device 10; a second security device 20; and an answer-back mechanism 30.

The remote controller 1 used for locking and unlocking the door includes: a door locking switch 1A; and a door unlocking switch 1B. When the locking switch 1A is pushed, a locking signal is transmitted from the remote controller 1, and when the unlocking switch 1B is pushed, an unlocking signal is transmitted from the remote controller 1. The locking and the unlocking signal transmitted from the remote controller 1 are weak electric waves and contain an identification code. The weak electric waves transmitted from the remote controller 1 are received by the high frequency circuit 2C via the antenna 2A which is built into the door control receiver 2 arranged inside the vehicle.

A computer used for controlling a body of the vehicle is built in the first security device 10. When a signal containing an identification code for locking or unlocking is inputted from the high frequency circuit 2C of the door control receiver 2 into the computer, it is judged by the identification code confirming function 12 whether or not the inputted identification code is appropriate. When the inputted identification code is appropriate, the door locking execution/release function 11 is activated, and a door locking signal or door unlocking signal is outputted into the door locking mechanism 3, and a door control motor built in each door is operated, so that the door can be locked or unlocked.

The second security device 20 conducts locking and unlocking of the vehicle running system. The second security device 20 includes: a running lock executing/releasing function 21; and an identification code recognizing function 22. The running lock executing/releasing function 21 is connected with the vehicle engine computer 5 having the running lock function 4. The running lock executing/releasing function 21 can prevent the vehicle from running when a signal is inputted into the engine computer 5. The identification code recognizing function 22 is connected with a precondition inputting mechanism of the running system arranged in the vehicle compartment. In this embodiment, this precondition inputting mechanism of the running system is the transmission control switch (also referred to as an over-drive ON/OFF switch, which will be referred to as O/D switch hereinafter) 7.

This precondition inputting mechanism will be explained in more detail as follows. In this embodiment, when a driver gets off the vehicle, the driver uses O/D switch 7 of the gear shift lever 6 as an input device for inputting the identification code. That is, the driver pushes this O/D switch 7 several times so as to set an identification code. For example, in the case where the driver pushes O/D switch 7 three times before the driver gets out of the vehicle, the identification code recognizing mechanism 22 of the second security device 20 stores this number (three) of times of ON and OFF operation as a precondition of unlocking the running system. Then, the running locking function 4 of the engine computer 5 is operated via the running locking executing and releasing mechanism 21.

On the other hand, in the case where the vehicle door is unlocked and the vehicle is started again when a predetermined period of time has passed after the lock of running, it is judged by the identification code recognizing device 22 whether or not the number of times of ON and OFF operation of O/D switch conducted by the driver is three which is the precondition of the running system. Only when the number of times of ON and OFF operation of O/D switch 7 is coincident with three times which is the precondition, an unlocking signal is outputted from the identification code recognizing device 22 to the running lock executing and releasing mechanism, so that the running lock is released. The second security device 20 is connected with the answer-back mechanism 30 in which, for example, a lamp of the vehicle is used. When the number of times of ON and OFF operation of O/D switch operated by the driver in the case of starting the engine again is appropriate, this answer-back mechanism 30 is turned on and off, so that the operator can know that the input of the identification code has been accepted.

Figure 2A:
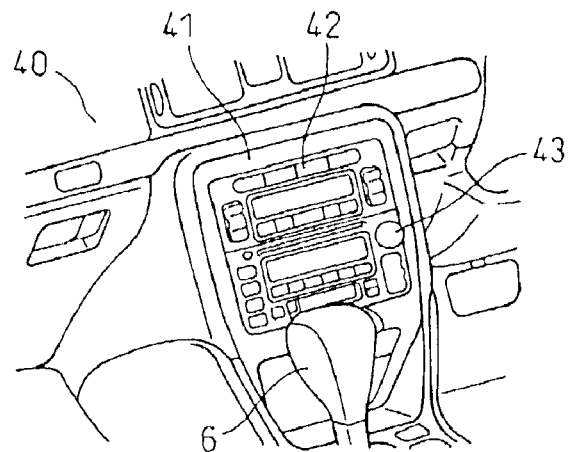
FIG. 2A is a perspective view showing another embodiment of the interior device, into which an identification code can be set, arranged in the periphery of a driver's seat of an automobile.

FIG. 2A is a view showing examples of the interior devices except for the gear shift lever 6 which are arranged in the periphery of the drivers seat in the vehicle and can be used for setting the precondition of the running system as an identification code. Examples of the above interior devices are: an operating section 42 of an air conditioner arranged in the center cluster 41 on the instrument panel 40 of the vehicle; and an operating section 43 of an audio device.

Figure 2B:
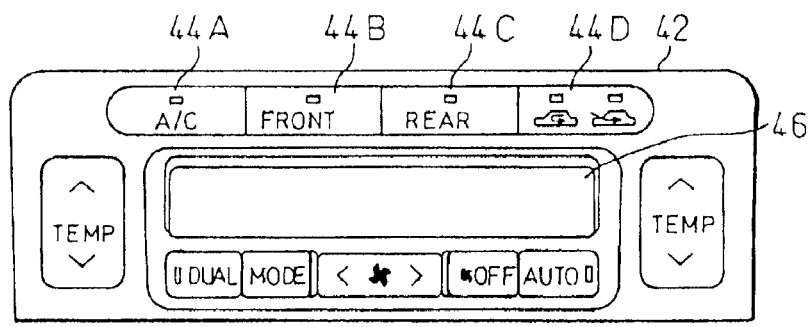
FIG. 2B is an enlarged view of the operating section of the air conditioner which is an interior device shown in FIG. 2A.

FIG. 2B is an enlarged view of the operating section 42 of the air conditioner shown in FIG. 2A. In the case of the operating section 42 of the air conditioner, for example, four switches independently arranged in the display section 46 can be used as input switches for inputting an identification code, that is, an A/C (air conditioner) switch 44A, an air-conditioned air current blowing switch 44B for blowing an air current to a windshield, an air-conditioned air current blowing switch 44C for blowing an air current to the rear seat, and an outside air and inside air change-over switch 44D can be used as input switches for inputting an identification code. In this case, for example, the identification code can be inputted by a combination of the four switches to be pushed.

Figure 2C:
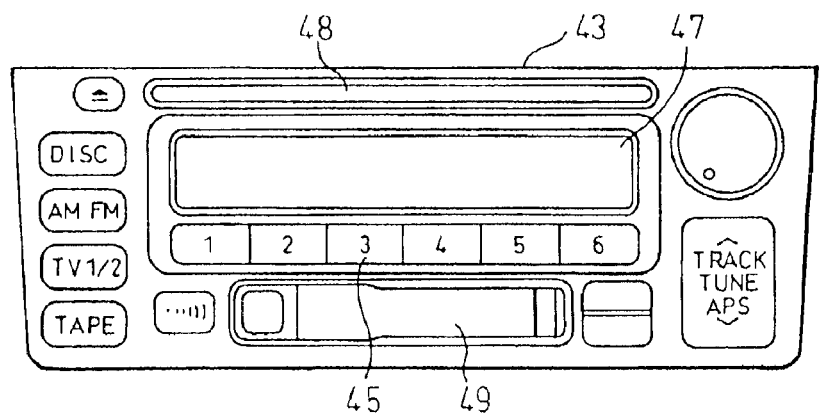
FIG. 2C is an enlarged view of the operating section of the audio device which is an interior device shown in FIG. 2A.

FIG. 2C is an enlarged view of the audio operating section 43 shown in FIG. 2A. In the case of the audio operating section 43, for example, six pre-set switches 45 independently arranged under the display section 47 can be used as input switches to input an identification code. In this case, it is possible to input the identification code by a combination of the six switches to be pushed or by a combination of the numbers written on the six switches.

Figure 3A:
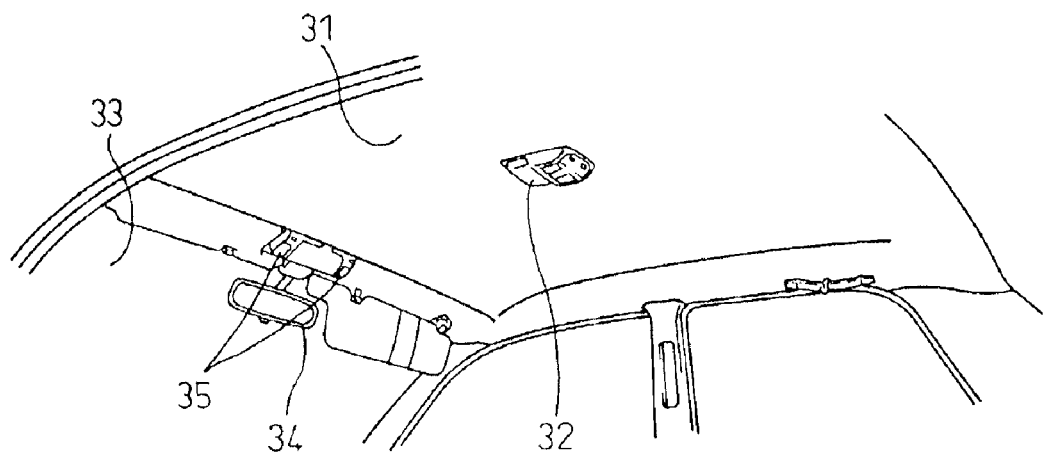
FIG. 3A is a partial perspective view of the interior of an automobile showing an arrangement of the lamp used for answer-back in the case where an identification code for unlocking is inputted to a vehicle theft prevention device of the present invention.

FIG. 3A is a view showing an example of answer-back in the case where the setting of an identification code for locking, which has been inputted from the aforementioned interior device, is completed and confirmed or in the case where the identification code of unlocking, which has been inputted from the aforementioned interior device, is correct in the vehicle theft prevention device 100 explained in FIG. 1. Examples of the answer-back mechanism 30 are: a lamp 32 arranged in the ceiling section 31 of the vehicle; and a map lamp 35 arranged on both sides of the attaching base section of the rear view mirror 35 located in an upper portion of the windshield 33. When these lamps are turned on and off, it is shown to the driver that the setting of the identification code for locking has been completed and the inputted identification code for unlocking is correct.

Figure 3B:
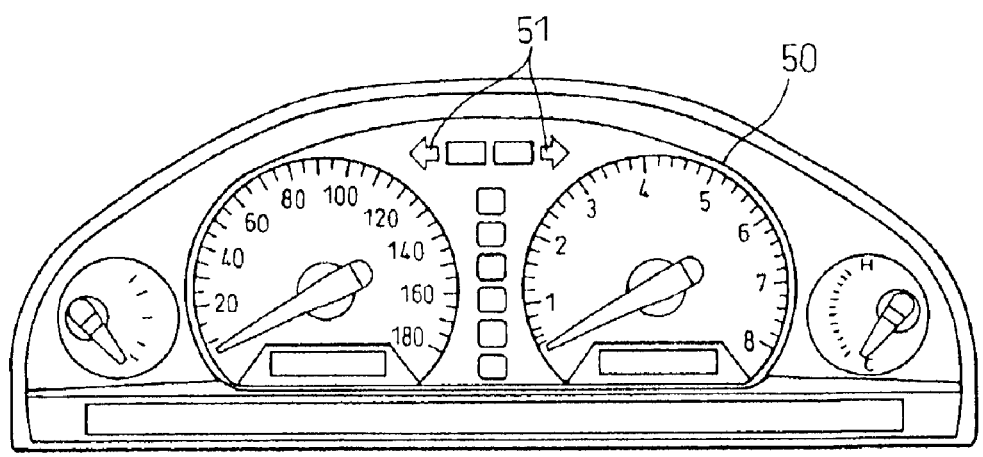
FIG. 3B is a front view showing a combination meter on an instrument panel used for answer-back in the case where an identification code for unlocking is inputted to a vehicle theft prevention device of the present invention.

FIG. 3B is a view showing another example of the answer-back mechanism 30 in the case where the identification code for unlocking, which has been inputted from the interior device described above, is correct in the vehicle theft prevention device 100 explained in FIG. 1. In this example, the hazard lamp 51 of the combination meter 50 arranged on the instrument panel of the vehicle is used as the answer-back mechanism 30. When this hazard lamp 51 is turned on and off, it is possible to show that the inputted identification code for unlocking is correct.

Figure 4A:
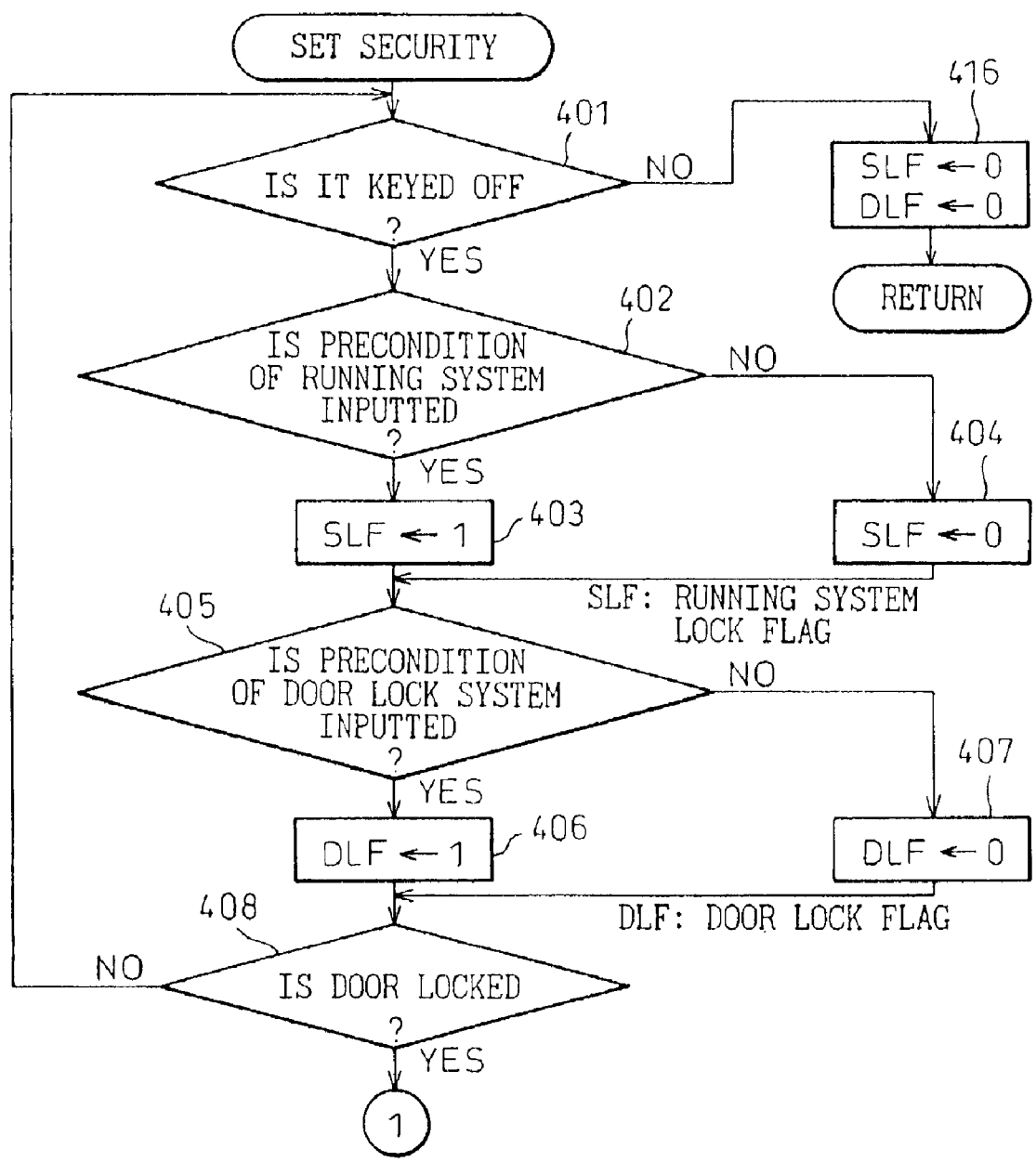
FIGS. 4A and 4B are flow charts showing an example of the procedure for setting security in a vehicle theft prevention device of the present invention.
Figure 4B:
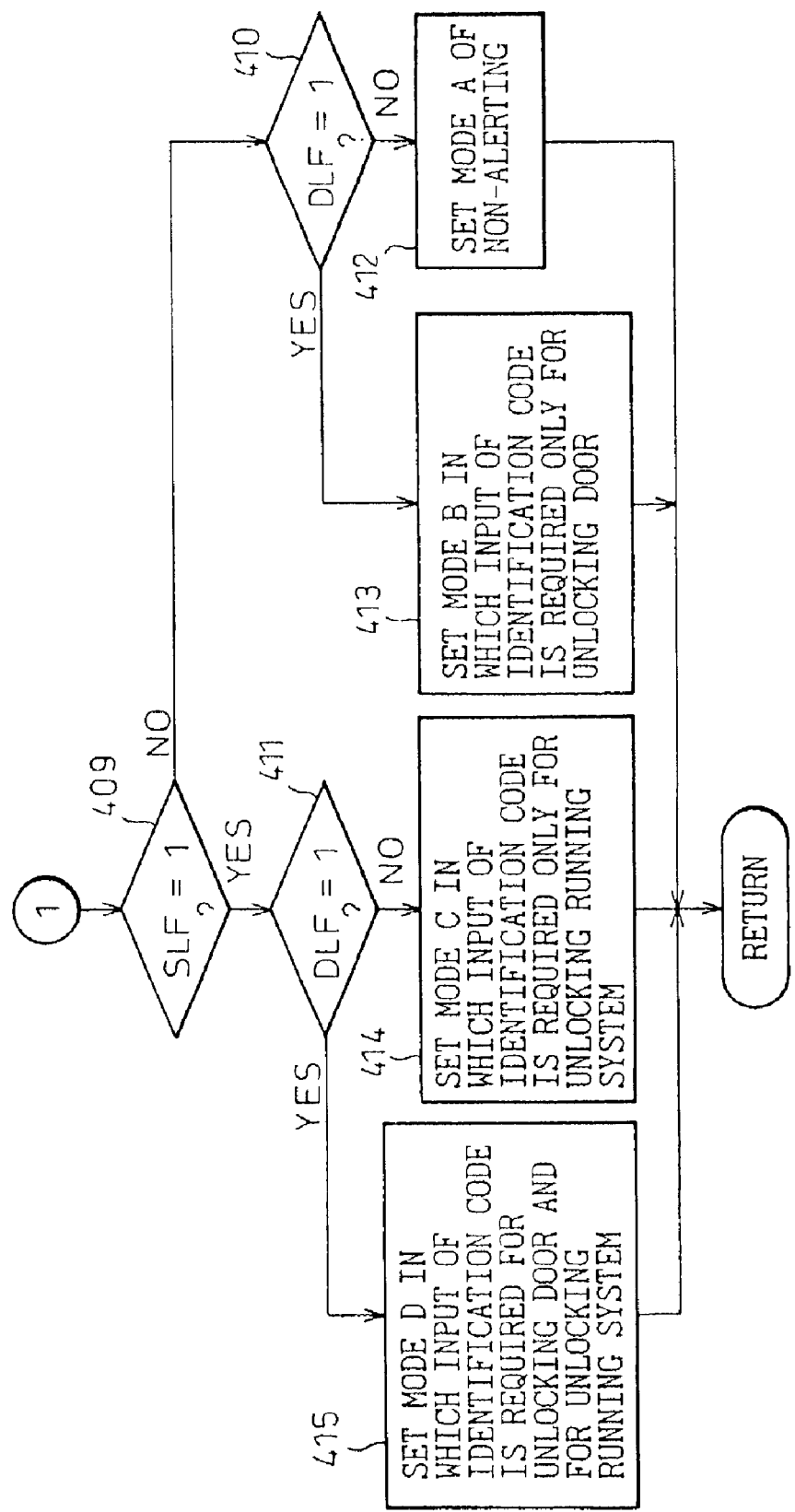

Referring to FIGS. 4A and 4B, an embodiment of the setting of security in the vehicle theft prevention device 100 of the present invention composed as described above will be explained below. The setting operation of security is executed when the vehicle has stopped. In step 401, it is judged whether or not the vehicle engine has been turned off by a key. In the case where the vehicle engine has not been turned off by the key, the running system lock flag SLF and door lock flag DLF, which will be described later, are made to be "0", and then this routine is finished. In the case where the vehicle engine has been turned off by the key, the program proceeds to step 402. In the case of a vehicle, the engine of which can be started and stopped without using a key, a key-off means a complete stop of the engine.

In step 402, it is judged whether or not the precondition of the running system is inputted. In the case where the precondition of the running system is inputted, the program proceeds to step 403, and the running system lock flag SLF is set at "1", and the program proceeds to step 405. On the other hand, in the case where the precondition of the running system is not inputted, the program proceeds to step 404, and the running system lock flag SLF is set at "0" and the program proceeds to step 405.

In step 405, it is judged whether or not the door lock system precondition is inputted with the remote controller. In the case where the door lock system precondition is inputted, the program proceeds to step 406, and the door lock flag DLF is set at "1", and the program proceeds to step 408. On the other hand, in the case where the door lock system precondition is not inputted, the program proceeds to step 407, and the door lock flag DLF is set at "0", and the program proceeds to step 408.

In step 408, it is judged whether or not the door is locked. In the case where the door is not locked, there is a possibility that the engine is started again after that. Therefore, the program returns to step 401, and it is judged again whether or not the key is turned off. In the case where key-off is released, the running system lock flag SLF and the door lock flag DLF are returned to "0" in step 416, and this routine is finished. In the case where the state of key-off is maintained, steps 402 to 407 are repeated.

In the case where it is judged in step 408 that the door has been locked, the mode of security is set according to the states of the running system lock flag SLF and the door lock flag DLF in steps 409 to 411. There are four types of security modes which will be described as follows.

(A) Non-alerting Mode

Non-alerting Mode is a mode in which the result is NO in step 402 and also the result is NO in step 405, that is, Non-alerting Mode is a mode in which neither the precondition of the running system nor the precondition of the door lock system is inputted. In this case, SLF="0" in step 404, and DLF="0" in step 407. Therefore, the result is NO in both steps 409 and 410. Accordingly, the program proceeds to step 412, and Non-alerting Mode A is set. In Non-alerting Mode A, it is possible to unlock the door when the remote controller or the key is normally operated, and the engine can be started by turning the key and the vehicle can be set in a running state. This is a mode which is set when a driver leaves a vehicle for a short while.

However, even in the case where the remote controller or the key is normally operated, it is possible that the door lock and the running system lock are operated and the lock will not be released even if somebody tries to release the door lock or the running system lock by a means except for the remote controller or the key.

(B) Door Lock Identification Code Release Mode

This mode is described as follows. Although the result is NO in step 402, the result is YES in step 405, and although the precondition of the running system is not inputted, only the precondition of the door lock system is inputted. In this case, SLF="0" in step 404, and DLF="1" in step 406. Therefore, although the result is NO in step 409, the result is YES in step 410. Accordingly, the program proceeds to step 413, and Mode B is set in which inputting of the identification code is required only for unlocking the door. In Mode B, as long as the remote controller transmits the identification code, the door cannot be unlocked. On the other hand, after the door has once been opened, the engine can be started by turning the key, and the vehicle can be driven.

(C) Running Lock Identification Code Release Mode

This mode is described as follows. Although the result is YES in step 402, the result is NO in step 405, and although the precondition of the running system is inputted, only the precondition of the door lock system is not inputted. In this case, SLF="1" in step 403, and DLF="0" in step 407. Therefore, although the result is YES in step 409, the result is NO in step 411. Accordingly, the program proceeds to step 414, and Mode C is set in which inputting of the identification code is required only for unlocking the running system. In Mode C, when the remote controller or the key is normally operated, it is possible to unlock the door. However, after the door has been once opened, as long as the precondition of the running system is not inputted, the engine can not be started and the vehicle can not be driven even if the key is turned.

(D) Door and Running Lock Identification Code Release Mode

This is a case in which the result is YES in step 402 and it is also YES in step 405, that is, this is a case in which both the precondition of the running system and the precondition of the door lock system are inputted. In this case, SLF="1" in step 403, and DLF="1" in step 406. Therefore, the result is YES in step 409, and the result is YES in step 411. Accordingly, the program proceeds to step 415, and Mode D is set in which inputting of the identification code is required only for unlocking both the door system and the running system. In Mode D, as long as the identification code is not transmitted from the remote controller, the door can not be unlocked. After the door has been once opened, as long as the precondition of the running system is not inputted, the engine can not be started and the vehicle can not be driven even if the key is turned.

As explained above, in the present invention, it is possible to set four types of modes according to the preference of the driver.

Next, referring to FIGS. 5A and 5B, operation of releasing the security, which has been set as described above, will be explained below. This operation of releasing the security is executed when a predetermined period of time has passed after the vehicle door was locked.

First, in step 501, it is judged whether or not the door has already been unlocked. In the case where the door has not been unlocked, the program proceeds to step 502. In the case where the door has already been unlocked, explanations will be made later. In step 502, it is judged whether or not the unlocking input signal has been received from the remote controller. In the case where the unlocking input signal has not been received from the remote controller, the routine is finished as it is. However, in the case where the unlocking input signal has been received from the remote controller, the program proceeds to step 503.

In step 503, it is judged whether the present security mode is Mode A or Mode C. That is, in step 503, it is judged whether or not the present security mode is a mode in which the precondition is inputted for unlocking the door. In the case where the present security mode is Mode A or C, the precondition is unnecessary for unlocking the door. Therefore, the program proceeds from step 503 to step 505, and the door is unlocked. On the other hand, in the case where the present security mode is Mode B or D, the precondition is necessary for unlocking the door. Therefore, the program proceeds from step 503 to step 504.

In step 504, it is judged whether or not the precondition of unlocking the door is contained in the unlocking input signal sent from the remote controller, and it is also judged whether or not the precondition is correct. In the case where the precondition is not correct, the program proceeds to step 510, and the door locking state is maintained and this routine is finished. On the other hand, in the case where it is judged that the precondition is correct in the judgment conducted in step 504, the program proceeds to step 505, and the door is unlocked. As described above, when the security mode is Mode B and Mode D, as long as the driver does not input the precondition of unlocking the door from the remote controller for unlocking, the vehicle door is kept locked.

In this connection, the above explanations are made into an example in which it is immediately judged whether or not the precondition of unlocking the door is correct in step 504. However, in the actual operation, the driver might mistakenly input the precondition of unlocking the door. Therefore, even when the driver mistakenly inputs the precondition of unlocking the door, it is possible for the driver to input the precondition over again once or twice. This case will be described later.

After the door has been unlocked in step 505, it is judged in step 506 whether or not the engine starter of the vehicle is turned on and the engine is started. In the case where the engine starter is not turned on after the door has been unlocked in step 505, the routine is finished as it is. In this case, when step 501 is executed after a predetermined period of time has passed, it is judged that the door has already been unlocked, and the program proceeds to step 506, and operation is repeated, in which it is judged whether or not the engine starter of the vehicle is turned on and the engine is started.

When it is judged in step 506 that the starter is turned on, the program proceeds to step 507, and it is judged whether the present security mode is Mode A or Mode B. In other words, it is judged in step 506 whether or not the precondition is inputted for unlocking the drive system. In the case where the present security mode is Mode A or Mode B, the precondition is unnecessary for unlocking the running system. Therefore, the program proceeds from step 507 to step 509, and the running system is unlocked. On the other hand, in the case where the present security mode is Mode C or Mode D, the precondition is necessary for unlocking the running system. Therefore, the program proceeds from step 507 to step 508.

In step 508, before the starter is turned on, a signal of unlocking the running system is inputted, and it is judged whether or not the precondition of unlocking the door is contained in the inputted signal and also it is judged whether or not the precondition is correct. In the case where the precondition is not correct, the program proceeds to step 511, and an alarm is given so as to notify the surroundings of the theft of the vehicle. In this case, it is also possible to lock the door again simultaneously when the alarm is given.

On the other hand, in the case where it is judged in step 508 that the precondition is correct, the program proceeds to step 509, and the running system is unlocked. As described above, when the security mode is Mode C and Mode D, as long as the driver inputs the precondition of unlocking the running system by using the interior device of the vehicle, the vehicle can not be driven even if the starter is turned on.

In this connection, the above explanations are made into an example in which it is immediately judged whether or not the precondition of unlocking the running system is correct in step 508. However, in the actual operation, the driver might mistakenly input the precondition of unlocking the running system. Therefore, even when the driver mistakenly inputs the precondition of unlocking the running system, it is possible for the driver to input the precondition over again once or twice. This case will be described later.

Figure 5B:
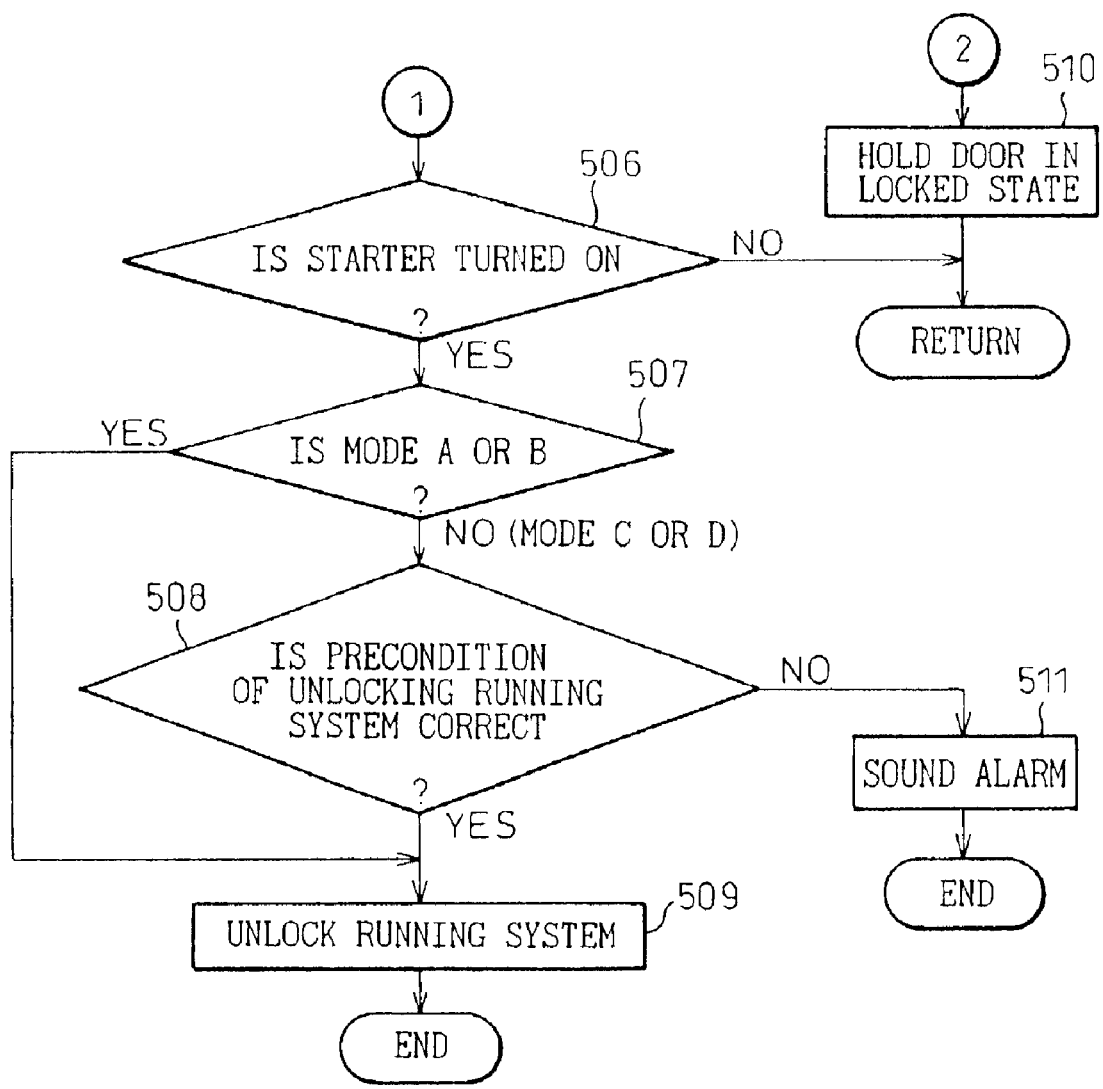
Figure 6:
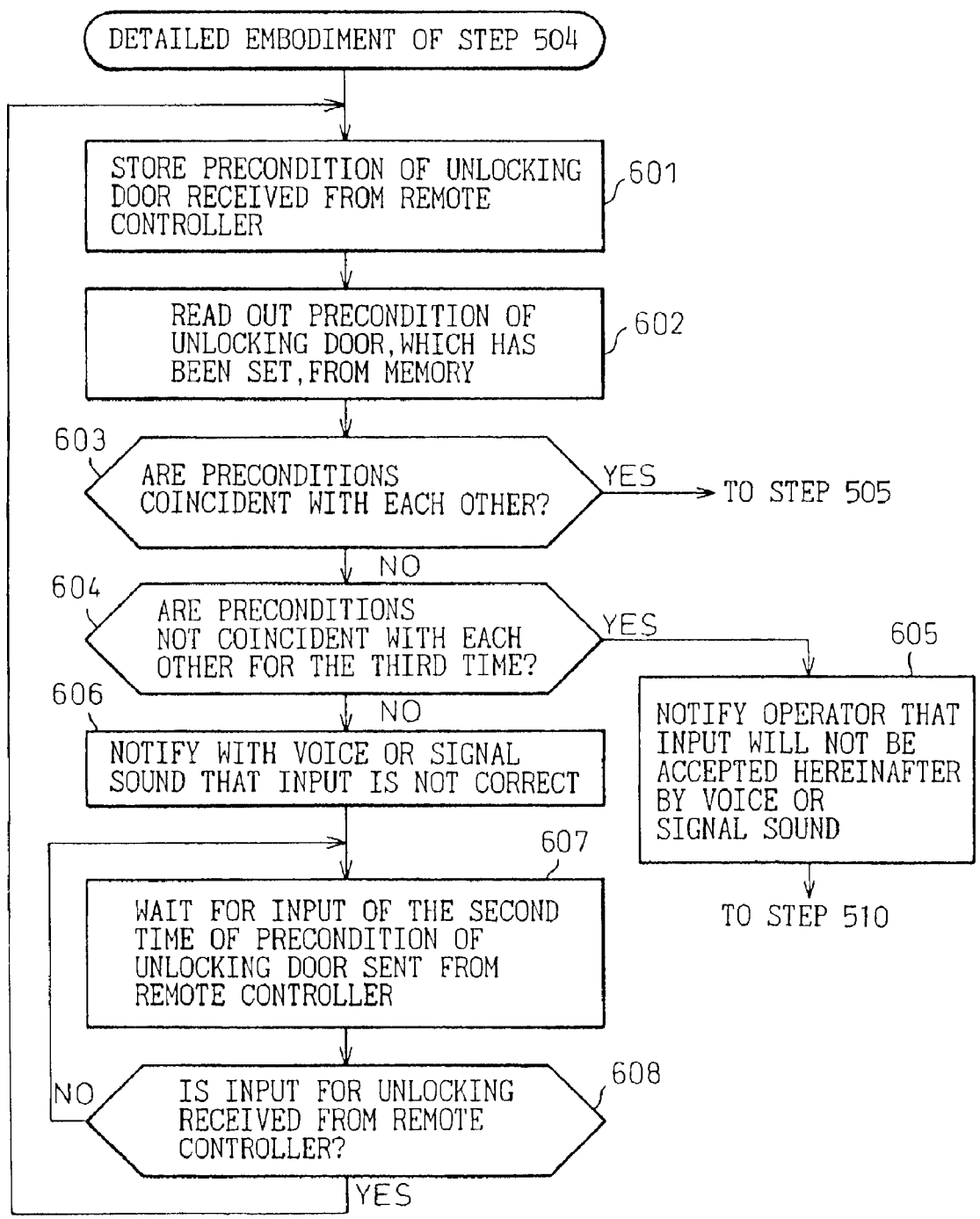

FIG. 6 is a view showing an embodiment in which a content of operation for permitting an input mistake of the precondition of unlocking the door once or twice is added to the content of step 504 explained referring to FIGS. 5A and 5B. The content of step 504 is explained in FIG. 6 in detail. In step 504, first, step 601 is executed, and the precondition of unlocking the door, which has been received from the remote controller, is stored. Successively, in step 602, the precondition of unlocking the door, which was set by the driver with the remote controller when the driver got off the vehicle and locked the door, is read out from the memory. In step 603, the precondition of unlocking the door, which has been inputted this time, is compared with the precondition of unlocking the door which has been read out from the memory. When the preconditions are coincident with each other in this comparison, the program proceeds to step 505 explained in FIGS. 5A and 5B.

On the other hand, when the preconditions are not coincident with each other in step 603, it is judged in step 604 whether or not this case, in which the preconditions are not coincident with each other, is the third time. In the case where this case, in which the preconditions are not coincident with each other, is not the third time, the program proceeds to step 606, and the operator is notified of the fact that the input conducted by the remote controller is not correct, by a voice or signal sound, that is, the operator is notified of the fact that the precondition of unlocking the door is not correct, by a voice or signal sound. In step 607, the program waits for an input of the second time of the precondition of unlocking the door from the remote controller. In step 608, it is judged whether or not an input of unlocking the door is received from the remote controller.

In the case where it is judged in step 608 that an input of the second time of the precondition of unlocking the door is received from the remote controller, the program returns to step 601, and steps 601 and 602 described before are executed, and it is judged in step 603 whether or not the preconditions are coincident with each other. When it is judged in step 603 that the precondition of unlocking the door inputted from the remote controller is not coincident with the precondition which is stored and further when it is judged in step 604 that this case, in which the precondition of unlocking the door inputted from the remote controller is not coincident with the precondition which is stored, is the third time, the program proceeds to step 605. Then, the operator is notified of the fact that an input of the precondition of unlocking the door conducted by the remote controller is not accepted anymore, by a voice or signal sound. After that, the program proceeds to step 510 and the door is kept locked.

As explained above, in the embodiment shown in FIG. 6, when the precondition of unlocking the door is inputted by the remote controller, the occurrence of an input mistake is permitted twice, and a correct input is demanded, however, when the occurrence of an input mistake is made three times, the door can not be unlocked. In this connection, the number of times of judging an input mistake conducted in step 604 is not limited to three times but the number of times of judging an input mistake may be conducted four times or five times. It is possible to appropriately change the number of times of permitting the occurrence of an input mistake.

Figure 7:
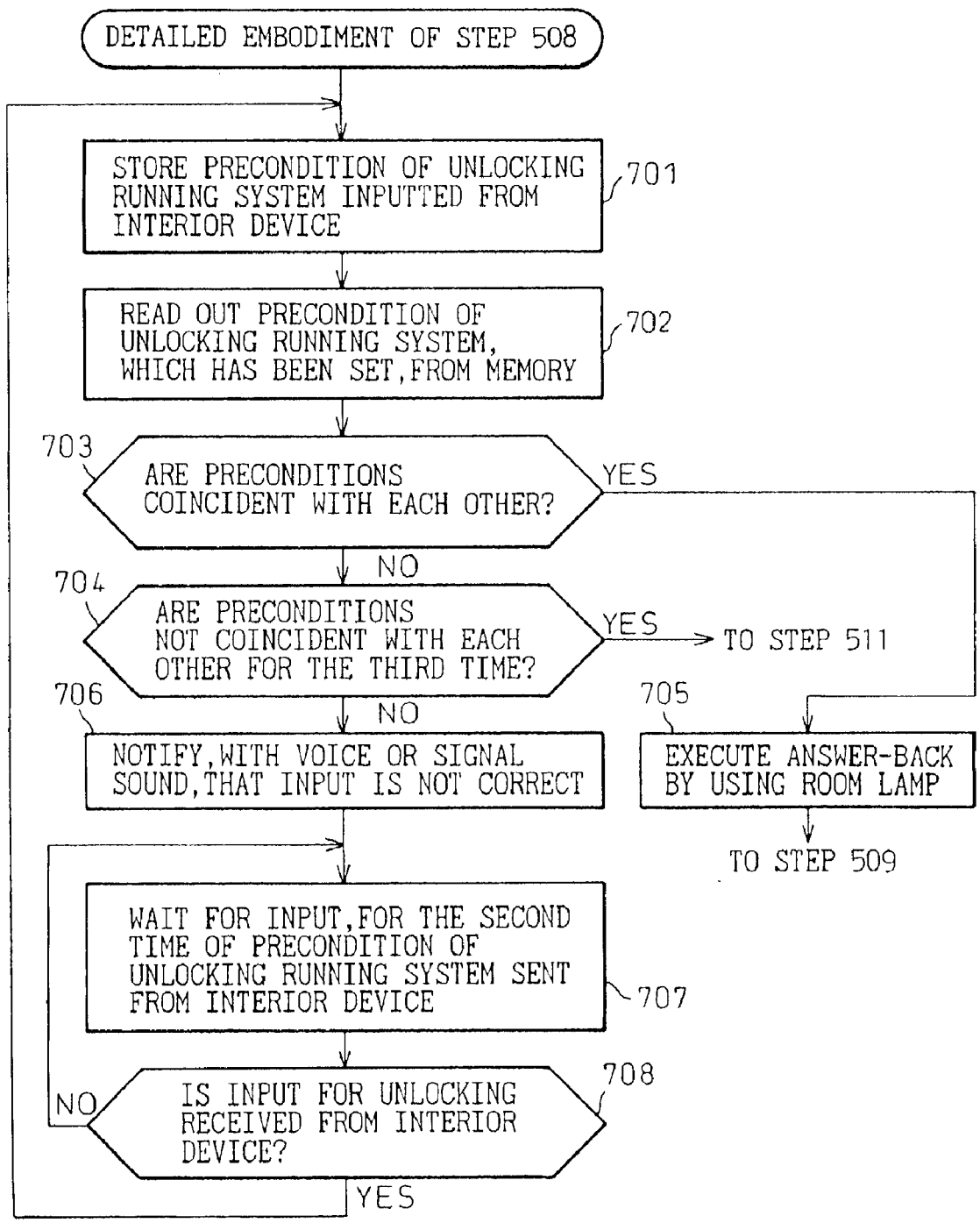

FIG. 7 is a view showing an embodiment in which a content of an operation for permitting an input mistake of the precondition of unlocking the running system once or twice is added to the content of step 508 explained referring to FIGS. 5A and 5B. The content of step 508 is explained in FIG. 7 in detail. In step 508, first, step 701 is executed, and the precondition of unlocking the running system, which has been inputted from the interior device such as O/D switch, is stored first. Successively, in step 702, the precondition of unlocking the running system, which was set with the interior device by the driver when the driver got off from the vehicle, is read out from the memory. In step 703, the precondition of unlocking the running system, which has been inputted this time, is compared with the precondition of unlocking the running system which has been read out from the memory. When the preconditions are coincident with each other in this comparison, the program proceeds to step 705 and, for example, the coincidence of the preconditions is answered back by turning on and off the room lamp 32 as explained in FIG. 3A. After the completion of answering back, the program proceeds to step 509 shown in FIGS. 5A and 5B, and the running system is unlocked.

On the other hand, when the preconditions are not coincident with each other in step 703, it is judged in step 704 whether or not this case, in which the preconditions are not coincident with each other, is of the third time. In the case where this case, in which the preconditions are not coincident with each other, is not of the third time, the program proceeds to step 706, and the operator is notified of the fact that the input conducted by the interior device is not correct, by a voice or signal sound, that is, the operator is notified of the fact that the precondition of unlocking the running system is not correct, by a voice or signal sound. In step 707, the program waits for an input of the second time of the precondition of unlocking the running system sent from the interior device. In step 708, it is judged whether or not an input of unlocking the running system is received from the interior device.

In the case where it is judged in step 708 that an input of the second time of the precondition of unlocking the running system is received from the interior device, the program returns to step 701, and steps 701 and 702 described before are executed, and it is judged in step 703 whether or not the preconditions are coincident with each other. When it is judged in step 703 that the precondition of unlocking the running system inputted from the interior device is not coincident with the precondition which is stored and further when it is judged in step 704 that this case, in which the precondition of unlocking the running system inputted from the interior device is not coincident with the precondition which is stored, is the third time, the program proceeds to step 511 shown in FIGS. 5A and 5B, and then an alarm is given. In this case, it is possible to lock the door again simultaneously when the alarm is given.

As described above, in the embodiment explained in FIG. 7, when the precondition of unlocking the running system is inputted from the interior device, an input mistake is permitted once and a correct input is demanded, however, when an input mistake is made three times, an alarm is given. In this connection, the number of times of judging an input mistake conducted in step 704 is not limited to three times but the number of times of judging an input mistake may be conducted four times or five times. It is possible to appropriately change the number of times of permitting the occurrence of an input mistake.

FIGS. 8A and 8B show an embodiment in which one more precondition for unlocking the running system is added to the embodiment, which is explained in FIG. 7, in which a content of operation for permitting an input mistake of the precondition for unlocking the running system once or twice is added to the content of step 508 explained referring to FIGS. 5A and 5B. That is, the precondition explained in FIG. 7 is defined as the first precondition, and further the second precondition is added to the first precondition.

Accordingly, when the program proceeds to step 508, first, step 701 is executed, and the precondition for unlocking the running system, which is inputted from the interior device such as O/D switch, is stored. At this time, the driver inputs the first precondition, for example, with O/D switch, and further the driver inputs an identification code, which is used as the second precondition, with four switches 44A to 44D arranged in the operating section 42 of an air conditioner. In step 701, these first and second preconditions are stored.

Successively, in step 702, the first precondition for unlocking the running system, which has been set with the interior device by the driver when the driver got out of the vehicle, is read out from the memory. In step 703, the first precondition for unlocking the running system inputted this time is compared with the first precondition for unlocking the running system read out from the memory. When the first preconditions are coincident with each other in this comparison, the program proceeds to step 801, and the value of clear flag CF of the first precondition is made to be "1". Successively, in step 705, for example, the room lamp 32 is turned on and off as explained in FIG. 3(a), so that the coincidence of the precondition can be answered back.

When the first precondition is cleared as described above, in the next step 802, the system demands to input the second precondition of the driver with a voice or sound signal. In the next step 803, it is judged whether or not the second precondition has been inputted. In the case where the second precondition has not been inputted, the program proceeds to step 511, and an alarm is given. In this case, it is possible to lock the door again simultaneously when the alarm is given. In the case where the second precondition has been inputted, the program proceeds to step 804, and the inputted second precondition is stored, and the second precondition is read out from the memory in the next step 805. In step 806, it is judged whether or not the inputted second precondition is coincident with the second precondition which has been read out from the memory. When the second preconditions are coincident with each other, the program proceeds to step 807. Then, for example, the room lamp 32 is turned on and off as explained in FIG. 3(a) so that the coincidence of the second conditions can be answered back. After the coincidence of the second conditions has been answered back, the program proceeds to step 509 shown in FIGS. 5A and 5B, and the running system is unlocked.

On the other hand, in the case where the second preconditions are not coincident with each other in step 806, it is judged in step 704 whether or not this case, in which the second preconditions are not coincident with each other, is the third time. In the case where this case, in which the second preconditions are not coincident with each other, is not the third time, the program proceeds to step 706, and the operator is notified of the fact that the input conducted by the interior device is not correct, by a voice or signal sound, that is, the operator is notified of the fact that the precondition of unlocking the running system is not correct, by a voice or signal sound. In step 808, it is judged whether or not clear flag CF of the first precondition is "1". In the case where the program proceeds from step 806, clear flag CF of the first precondition has already been "1", that is, "CF="1". Therefore, the program proceeds to step 802, and the processes from step 802 to step 806 are executed again.

The occurrence of a case, in which the second preconditions are not coincident with each other in step 806, is permitted twice by the judgment conducted in step 704. However, when the occurrence of a case, in which the second preconditions are not coincident with each other in step 806, is of the third time, the program proceeds to step 511, and an alarm is given. In this case, it is possible to lock the door again simultaneously when the alarm is given. As described above, in the case where the second precondition can not be cleared even if the first precondition can be cleared, it is impossible to unlock the running system. Therefore, according to this embodiment, it is possible to effectively prevent the vehicle from being stolen by a third person except for the driver.

On the other hand, in the case where the first preconditions are not coincident with each other in step 703, after the value of a clear flag of the first precondition is made to be "0" in step 800, it is judged in step 704 whether or not the occurrence of a case, in which the preconditions are not coincident with each other, is of the third time. In the case where this case, in which the preconditions are not coincident with each other, is not of the third time, the program proceeds to step 706, and the operator is notified of the fact that the input conducted by the interior device is not correct, by a voice or signal sound, that is, the operator is notified of the fact that the precondition of unlocking the running system is not correct, by a voice or signal sound. After it has been confirmed in step 808 that the value of the clear flag of the first precondition is not "1", in step 707, the system waits for the precondition for unlocking the running system to be inputted again from the interior device. In step 708, it is judged whether or not the inputting of unlocking the running system has been received from the interior device.

When it is judged in step 708 that the inputting of the precondition of unlocking the running system has been received from the interior device, the program returns to step 701, and the processes of steps 701 and 702 are executed, and the coincidence of the first preconditions is judged in step 703. In the case where it is judged in step 703 that the precondition for unlocking the running system inputted from the interior device is not coincident with the stored first precondition and further the occurrence of this case, in which the precondition for unlocking the running system inputted from the interior device is not coincident with the stored first precondition, is of the third time, the program proceeds to step 511 shown in FIGS. 5A and 5B, and an alarm is given.

As described above, in the embodiment explained in FIGS. 8A and 8B, when the first and the second precondition for unlocking the running system are inputted by the interior device, the occurrence of an input mistake is permitted twice and the system demands a correct input, and when the occurrence of an input mistake is caused three times, an alarm is given. In this connection, the number of times of permitting the occurrence of an input mistake in step 704 is not limited to three times as described above.

In this connection, in addition to the embodiment explained above, it is possible to simultaneously conduct an operation of unlocking the running system and an operation of unlocking the door by a combination of the number of times of pushing a plurality of buttons of the interior device or by a combination of pushing positions of the interior device. For example, operation may be performed as follows. In the case where a specific precondition for locking the running system is set with the interior device and even in the case where a specific precondition for locking the door is set with the remote controller, if a special precondition is transmitted from the remote controller, both the door and the running system can be simultaneously unlocked. In this case, it is composed as follows. In the case where the precondition for unlocking the door is transmitted from the remote controller, a specific precondition for unlocking the running system must be inputted by the interior device.

In the case where a special precondition is transmitted from the remote controller, it is possible to arrange that a room lamp is turned on and off in the middle of transmission in a manner different from the usual manner of answering back, so that the operator can confirm that the transmission is normally performed in the middle of the transmission process.

As explained above, according to the present invention, in the theft prevention device in which the locking mechanism and the unlocking mechanism are arranged in both the running system and the door opening and closing system of a vehicle, even if the door is unlocked by the remote controller, the running system of the vehicle can not be unlocked. Due the above constitution, it is possible to more positively prevent the vehicle from being stolen.

In this connection, the above explanations are made into embodiments of the vehicle theft prevention device. However, it should be noted that the vehicle theft prevention device of the present invention can be applied to a case of theft prevention of another moving body such as a ship or airplane.

What is claimed is:

1. A vehicle theft prevention device comprising:
   a first security means for locking a vehicle so as to prevent an intrusion into the vehicle;
   a second security means for locking a running system of the vehicle;
   a first unlocking means for unlocking the first security means in accordance with the input of a first condition;
   a second unlocking means for unlocking the second security means in accordance with the input of a second condition;
   a first selection means for selecting whether or not an input of a third condition is required for unlocking the first unlocking means; and
   a second selection means for selecting whether or not an input of a fourth condition is required for unlocking the second unlocking means.

2. A vehicle theft prevention device according to claim 1, wherein the second unlocking means can be operated after the first unlocking means has conducted an unlocking operation.

3. A vehicle theft prevention device comprising:
   a first security means for locking a vehicle so as to prevent an intrusion into the vehicle;
   a second security means for locking a running system of the vehicle;
   a first unlocking means for unlocking the first security means in accordance with the input of a first condition;
   a second unlocking means for unlocking the second security means in accordance with the input of a second condition;
   a first selection means for selecting whether or not an input of a third condition is required for unlocking the first unlocking means; and
   a second selection means for selecting whether or not an input of a fourth condition is required for unlocking the second unlocking means,
   wherein, when the second unlocking means does not conduct an unlocking operation in a predetermined period of time after the completion of unlocking operation conducted by the first unlocking means, the first security means conducts a locking operation again.

4. A vehicle theft prevention device according to claim 1, wherein a setting of the selecting operation of the first selecting means is conducted by a remote controller capable of transmitting a vehicle door locking signal and vehicle door unlocking signal.

5. A vehicle theft prevention device according to claim 4, wherein a setting of a locking operation of the first security means and an unlocking operation of the first unlocking means is conducted by the remote controller according to the numbers of pushed times of pushing push-buttons of the remote controller.

6. A vehicle theft prevention device according to claim 4, wherein a setting of the fourth condition is conducted by utilizing buttons of a first interior device arranged close to a driver's seat in the vehicle.

7. A vehicle theft prevention device according to claim 6 wherein, when a setting of a locking operation of the second security means and an unlocking operation of the second unlocking means conducted by the buttons of the interior device is completed, completion of the setting is notified to a driver by another interior device different from the first interior device.

8. A vehicle theft prevention device according to claim 6, wherein an unlocking operation of the second unlocking means and that of the first unlocking means are simultaneously performed according to a combination of the number of times buttons of the interior device are pushed or the positions of the buttons are pushed.

9. A vehicle theft prevention device according to claim 6, wherein a confirming operation of confirming the setting, which is performed by another interior device, is different when the setting of a precondition of an unlocking operation conducted by the second unlocking means with the button of the interior device is performed simultaneously with the unlocking operation of the first unlocking means and when the setting of a precondition of an unlocking operation conducted by the second unlocking means is performed independently from the unlocking operation of the first unlocking means.

10. A vehicle theft prevention device according to claim 9, wherein a difference in the confirming operation conducted by the interior device is a difference of the number of times of turning on and off a lamp in the vehicle.

11. A vehicle theft prevention device according to claim 6, wherein the setting of the fourth condition is performed with the buttons of the interior device according to a combination of times buttons of the interior device are pushed or positions of the buttons are pushed.

12. A vehicle theft prevention device according to claim 11 wherein, when the setting of the fourth condition for the locking operation of the second security means and unlocking operation of the second unlocking means performed with the buttons of the interior device is completed, the completion of the setting is notified to a driver by another interior device different from the first interior device.

13. A vehicle theft prevention device according to claim 12 wherein, when a setting of the locking operation of the second security means is conducted in a plurality of stages, an unlocking operation by the second unlocking means is possible only when the unlocking operation is conducted in a plurality of stages in the same manner as that of the locking operation.

14. A vehicle theft prevention device according to claim 11, wherein the unlocking operation of the second unlocking means and the unlocking operation of the first unlocking means are simultaneously conducted by a combination of the number of times buttons of the interior device are pushed or positions of the buttons are pushed.

15. A vehicle theft prevention device according to claim 11, wherein the confirming operation of confirming the setting, which is performed by another interior device, is different when the setting of the fourth condition of an unlocking operation conducted by the second unlocking means with the button of the interior device is performed simultaneously with the unlocking operation of the first unlocking means and when the setting of the fourth condition of unlocking operation conducted by the second unlocking means is performed independently from the unlocking operation of the first unlocking means.

16. A vehicle theft prevention device according to claim 15, wherein a difference of the confirming operation conducted by the interior device is a difference of the number of times of turning on and off a lamp in the vehicle.

17. A vehicle theft prevention device according to claim 1, wherein when the first and the second security means are locked by locking the door with the key or with the remote controller capable of transmitting a vehicle door locking signal and unlocking signal after the driver gets out of the vehicle, the first and the second security means can be simultaneously unlocked by an unlocking operation conducted by the key or the remote controller.

18. A vehicle theft prevention device comprising:
a first security means for locking a vehicle so as to prevent an intrusion into the vehicle;
a second security means for locking a running system of the vehicle;
a first unlocking means for unlocking the first security means in accordance with the input of a first condition;
a second unlocking means for unlocking the second security means in accordance with the input of a second condition;
a first selection means for selecting whether or not an input of a third condition is required for unlocking the first unlocking means; and
a second selection means for selecting whether or not an input of a fourth condition is required for unlocking the second unlocking means,
wherein, when the second unlocking means does not conduct an unlocking operation in a predetermined period of time after the completion of unlocking operation conducted by the first unlocking means, the first security means conducts a locking operation again, and
wherein the setting of the locking operation of the first unlocking mans is conducted by a remote controller capable of transmitting a vehicle door locking signal and vehicle door unlocking signal.

19. A vehicle theft prevention device comprising:
a first security means for locking a vehicle so as to prevent an intrusion into the vehicle;
a second security means for locking a running system of the vehicle; and
a unlocking means for independently unlocking the first security means and the second security means,
wherein the unlocking means is composed of a first unlocking means and a second unlocking means, the first unlocking means unlocking the first security means and the second unlocking means unlocking the second security means,
wherein the second unlocking means can be operated after the first unlocking means has conducted an unlocking operation, and
wherein, when the second unlocking means does not conduct an unlocking operation in a predetermined period of time after the completion of unlocking operation conducted by the first unlocking means, the first security means conducts a locking operation again.

20. A vehicle theft prevention device comprising:
a first security means for locking a vehicle so as to prevent an intrusion into the vehicle;
a second security means for locking a running system of the vehicle; and
an unlocking means for independently unlocking the first security means and the second security means,
wherein at least one of the first security means and the second security means conducts locking, when a driver locks a door of the vehicle from the outside of the vehicle after the driver inputs a specific precondition into the unlocking means before the driver leaves the vehicle,
wherein a setting of the locking operation of the first security means and the unlocking operation of the first unlocking means is conducted by a remote controller capable of transmitting a vehicle door locking signal and vehicle door unlocking signal,
wherein a setting of a locking operation of the first security means and an unlocking operation of the first unlocking means is conducted by the remote controller according to the numbers of pushed times of pushing push-buttons of the remote controller,
wherein a setting of the locking operation of the second security means and the unlocking operation of the second unlocking means is conducted by utilizing buttons of an interior device arranged close to a driver's seat in the vehicle, and
wherein, when a setting of a locking operation of the second security means and an unlocking operation of the second unlocking means conducted by the buttons of the interior device is completed, completion of the setting is notified to a driver by another interior device different from the first interior device.

21. A vehicle theft prevention device comprising:
a first security means for locking a vehicle so as to prevent an intrusion into the vehicle;
a second security means for locking a running system of the vehicle; and
an unlocking means for independently unlocking the first security means and the second security means,
wherein at least one of the first security means and the second security means conducts locking, when a driver locks a door of the vehicle from the outside of the vehicle after the driver inputs a specific precondition into the unlocking means before the driver leaves the vehicle,
wherein a setting of the locking operation of the first security means and the unlocking operation of the first unlocking means is conducted by a remote controller capable of transmitting a vehicle door locking signal and vehicle door unlocking signal,
wherein a setting of a locking operation of the first security means and an unlocking operation of the first unlocking means is conducted by the remote controller according to the numbers of pushed times of pushing push-buttons of the remote controller,
wherein a setting of the locking operation of the second security means and the unlocking operation of the second unlocking means is conducted by utilizing buttons of an interior device arranged close to a driver's seat in the vehicle, and
wherein a confirming operation of confirming the setting, which is performed by another interior device, is different when the setting of the a precondition of an unlocking operation conducted by the second unlocking means with the button of the interior device is performed simultaneously with the unlocking operation of the first unlocking means and when the setting of the a precondition of an unlocking operation conducted by the second unlocking means is performed independently from the unlocking operation of the first unlocking means.

22. A vehicle theft prevention device according to claim 21, wherein a difference in the confirming operation conducted by the interior device is a difference of the number of times of turning on and off a lamp in the vehicle.

23. A vehicle theft prevention device comprising:

a first security means for locking a vehicle so as to prevent an intrusion into the vehicle;

a second security means for locking a running system of the vehicle; and an unlocking means for independently unlocking the first security means and the second security means, wherein at least one of the first security means and the second security means conducts locking, when a driver locks a door of the vehicle from the outside of the vehicle after the driver inputs a specific precondition into the unlocking means before the driver leaves the vehicle, wherein a setting of the locking operation of the first security means and the unlocking operation of the first unlocking means is conducted by a remote controller capable of transmitting a vehicle door locking signal and vehicle door unlocking signal, wherein a setting of a locking operation of the first security means and an unlocking operation of the first unlocking means is conducted by the remote controller according to the numbers of pushed times of pushing push-buttons of the remote controller, wherein, the a setting of the locking operations of the second security means and the unlocking operation of the second unlocking means is conducted by utilizing buttons of an interior device arranged close to a driver's seat in the vehicle, wherein a setting of the locking operation of the second security means and the unlocking operation of the second unlocking means is performed with the buttons of the interior device according to a combination of times buttons of the interior device are pushed or positions of the buttons are pushed, and wherein, when the setting of the locking operations of the second security means and unlocking operation of the second unlocking means performed with the buttons of the interior device is completed, the completion of the setting is notified to a driver by another interior device different from the first interior device.

24. A vehicle theft prevention device according to claim 23 wherein, when the setting of the locking operation of the second security means is conducted in a plurality of stages, unlocking operation by the second unlocking means is possible only when the unlocking operation is conducted in a plurality of stages in the same manner as that of the locking operation.

25. A vehicle theft prevention device comprising:

a first security means for locking a vehicle so as to prevent an intrusion into the vehicle;

a second security means for locking a running system of the vehicle; and an unlocking means for independently unlocking the first security means and the second security means, wherein at least one of the first security means and the second security means conducts locking, when a driver locks a door of the vehicle from the outside of the vehicle after the driver inputs a specific precondition into the unlocking means before the driver leaves the vehicle, wherein a setting of the locking operation of the first security means and the unlocking operation of the first unlocking means is conducted by a remote controller capable of transmitting a vehicle door locking signal and vehicle door unlocking signal, wherein a setting of a locking operation of the first security means and an unlocking operation of the first unlocking means is conducted by the remote controller according to the numbers of pushed times of pushing push-buttons of the remote controller, wherein a setting of the locking operation of the second security means and the unlocking operation of the second unlocking means is conducted by utilizing buttons of an interior device arranged close to a driver's seat in the vehicle, wherein a setting of the locking operation of the second security means and the unlocking operation of the second unlocking means is performed with the buttons of the interior device according to a combination of times buttons of the interior device are pushed or positions of the buttons are pushed, and wherein a confirming operation of confirming the setting, which is performed by another interior device, is different when a setting of a precondition of an unlocking operation conducted by the second unlocking means with the button of the interior device is performed simultaneously with the unlocking operation of the first unlocking means and when the setting of a precondition of an unlocking operation conducted by the second unlocking means is performed independently from the unlocking operation of the first unlocking means.

26. A vehicle theft prevention device according to claim 25, wherein a difference of the confirming operation conducted by the interior device is a difference of the number of times of turning on and off a lamp in the vehicle.

27. A vehicle theft prevention device comprising:

a first security means for locking a vehicle so as to prevent an intrusion into the vehicle;

a second security means for locking a running system of the vehicle; and an unlocking means for independently unlocking the first security means and the second security means, wherein the unlocking means is comprised of a first unlocking means and a second unlocking means, the first unlocking means unlocking the first security means and the second unlocking means has conducted an unlocking operation, wherein the second unlocking means can be operated after the first unlocking means has conducted an unlocking operation, wherein, when the second unlocking means does not conduct an unlocking operation in a predetermined period of time after the completion of unlocking operation conducted by the first unlocking means, the first security means conducts a locking operation again, and wherein the setting of the locking operation of the first unlocking mans is conducted by a remote controller capable of transmitting a vehicle door locking signal and vehicle door unlocking signal.

* * * * *